United States Patent [19]

King

[11] 4,198,860
[45] Apr. 22, 1980

[54] METHOD AND APPARATUS FOR MEASURING PARTICULATE MATTER FLOW RATE

[75] Inventor: William R. King, Bartlesville, Okla.

[73] Assignee: Phillips Petroleum Company, Bartlesville, Okla.

[21] Appl. No.: 881,479

[22] Filed: Feb. 27, 1978

[51] Int. Cl.² .............................................. G01F 1/74
[52] U.S. Cl. ...................................... 73/195; 73/213; 222/55; 222/63
[58] Field of Search ............... 73/28, 205 R, 196, 211, 73/213, 195; 222/55, 63

[56] References Cited

U.S. PATENT DOCUMENTS

| | | | |
|---|---|---|---|
| 2,057,767 | 10/1936 | Collins | 73/205 |
| 2,058,654 | 10/1936 | Allton | 73/213 |
| 2,337,921 | 12/1943 | Petroe | 73/213 |
| 2,439,723 | 4/1948 | Engdahl | 73/213 X |
| 2,668,365 | 2/1954 | Hogin | 34/57 |
| 2,739,845 | 3/1956 | Berg | 302/29 |
| 2,741,796 | 4/1956 | King | 18/1 |
| 2,898,158 | 4/1959 | Pollock | 302/53 |
| 2,905,538 | 9/1959 | McIntire | 23/284 |
| 2,963,907 | 12/1960 | Sylvest | 222/55 |
| 2,984,105 | 5/1961 | Nagel et al. | 73/196 |
| 3,073,158 | 1/1963 | Knauth | 73/206 |
| 3,102,422 | 9/1963 | Hatfield | 73/194 |
| 3,195,958 | 7/1965 | Goins | 302/17 |
| 3,232,486 | 2/1966 | Ofner | 222/55 |
| 3,310,882 | 3/1967 | Barber et al. | 34/10 |
| 3,408,866 | 11/1968 | Gibson et al. | 73/211 X |
| 3,595,091 | 7/1971 | Bernutat | 73/432 |
| 3,924,448 | 12/1975 | Howard et al. | 73/53 X |

FOREIGN PATENT DOCUMENTS 313091  11/1971  U.S.S.R. .................. 73/195

*Primary Examiner*—Herbert Goldstein

[57] ABSTRACT

A flow rate meter is provided for measuring the flow rate of particulate material being conveyed in a fluid stream along a tubular member. The apparatus includes a throat portion in the tubular member which has a length sufficient to accomplish a pressure drop adequate for accurate particulate material flow rate measurement in the conveying of particulate material in a fluid stream through the throat. The pressure drop is measured across the throat and the measured pressure drop is correlated with the particulate material flow rate. There can be provided converging and diverging tubular sections on opposite sides of the throat to form a venturi. One or more of the flow rate meters can be used in the control of a particulate material blending system. A fluid flow rate measuring means can be used in conjunction with the flow rate meter to provide a signal representative of the difference between the flow rate of particulate material and fluid and the flow rate of the fluid alone, i.e., the flow rate of particulate material alone.

32 Claims, 4 Drawing Figures

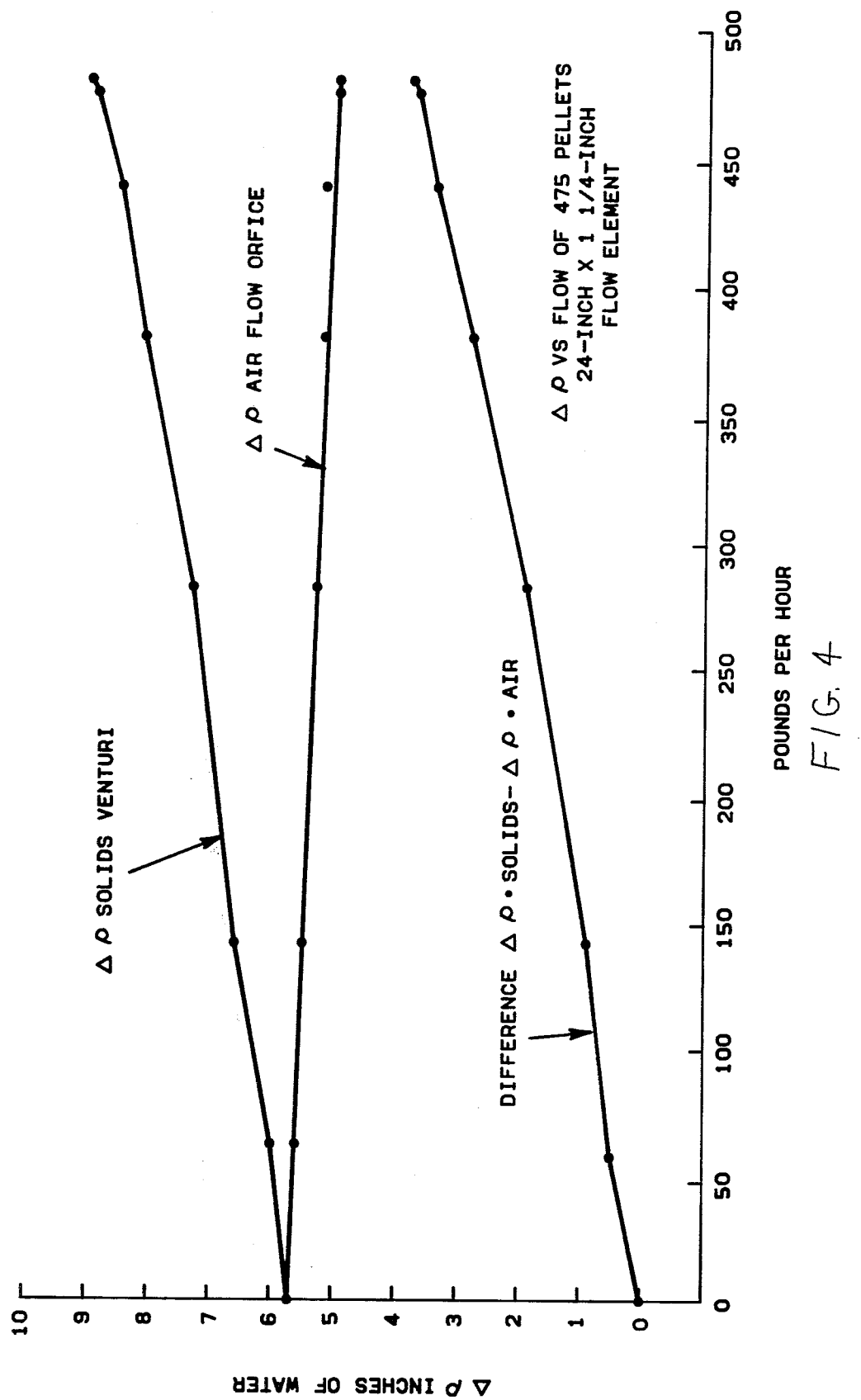

METHOD AND APPARATUS FOR MEASURING PARTICULATE MATTER FLOW RATE

The present invention relates to a method and apparatus for measuring the flow rate of particulate material being conveyed in a fluid stream in a transport system. In one aspect the apparatus is useful in particulate material blending systems.

In the handling of particulate material such as pellets of plastic or rubber material or other particulate materials it is oftentimes desirable to be able to determine the flow rate of the particulate material, as for example in blending operations. Currently, one method of blending particulate materials is to weigh respective quantities of different particulate materials to be mixed and place the weighed quantities in mixing equipment for subsequent mixing. Before weighing, the particulate materials normally would have to be stored in a hopper or the like for later dispensing of a given quantity. The material from the storage apparatus is then taken to a scale and weighed, and the weight is adjusted by adding or taking away material to give the desired quantity. The particulate material is then transported to means for mixing two or more particulate materials together. Automatic batch weighers can be utilized in such applications as can automatic feeder-weighers, e.g., a Merrich Weightometer, Hardinge feeder-weigher, Richardson automatic scale, Bailey solids flowmeter or the like. Such apparatus are well known in the art and are briefly described at page 10-84 in *Standard Handbook For Mechanical Engineers*, Seventh Edition, by Baumeister and Marks, published by McGraw-Hill Book Company. However, such apparatus is expensive, cumbersome, and is costly to operate and maintain. It is therefore desirable to provide a simple and inexpensive apparatus and method for continuously determining the flow rates of various particulate materials such that the flow rates can be continuously regulated relative to one another to effect mixing or the like and the flow rates can be regulated relative to one another to effect mixing in the desired proportions.

In the handling of particulate materials, it is oftentimes desirable to regulate a single flow stream of particulate material as it is being conveyed to a point of use or the like. If a piece of equipment requires a certain quantity of particulate material per unit time, then it would be desirable to know the flow rate of particulate material being fed to such an apparatus such that the flow rate can be regulated in accordance to the apparatus requirement.

The present invention provides method and apparatus for accurately determining the flow rate of particulate material as it is being conveyed in a fluid stream. By employing a throat in a tubular member, it has been found that the flow rate of particulate materials can be accurately determined if the throat has a length sufficient to effect a pressure drop of at least about 4 inches of water (1 kPa) along the throat. This can normally be accomplished by the use of a venturi meter having a throat length of at least about 3 times the inside diameter of the throat.

The operating principle of a venturi meter is that energy is required to accelerate the fluid as it enters the narrow throat from the converging section. The only available source of energy is the fluid pressure which must accordingly drop in order to accelerate the fluid. When the fluid carries entrained particulate material extra energy is required to accelerate the particulate material as well as the fluid thus increasing the pressure drop. Due to the greater mass of the particulate material relative to the mass of the carrier fluid, there is a greater resistance to acceleration by the particulate material and the velocity of the particulate material does not increase significantly unless the particulate material is exposed to the higher velocities for a relatively long time. Thus, the typical venturi meter, which has a very short throat length, shows little increase in pressure drop when a solid is entrained in the fluid. However, by increasing the length of the throat of the venturi, the particulate material will accelerate to higher velocities to produce a significant pressure drop related to the flow rate or concentration of particulate material.

It is an object of the present invention to provide an apparatus adapted for measuring the flow rate of a particulate material being conveyed in a fluid stream. Another object of the present invention is to provide an apparatus which requires no moving parts for measuring the flow rate of a particulate material being conveyed in a fluid stream. Another object of the present invention is to provide a method for measuring the flow rate of particulate material being conveyed in a fluid stream. A further object of the present invention is to provide a method and apparatus for measuring the flow rate of particulate material in a fluid stream which are accurate. A still further object of the present invention is to provide a method and apparatus for measuring the flow rate of particulate material in a fluid stream in which the flow rate of the fluid is determined by measuring the pressure drop of the fluid along a tubular member and correlating the measured pressure drop to the flow rate of the particulate material.

Other objects and advantages of the present invention will become apparent from the following detailed description taken in connection with the accompanying drawings wherein are set forth by way of illustration and example certain embodiments of this invention.

FIG. 4 is a graph illustrating a functional relationship of pressure drop to flow rate for both particulate material and carrier fluid and the flow rate difference between the particulate material and fluid carrier.

Figure 1:
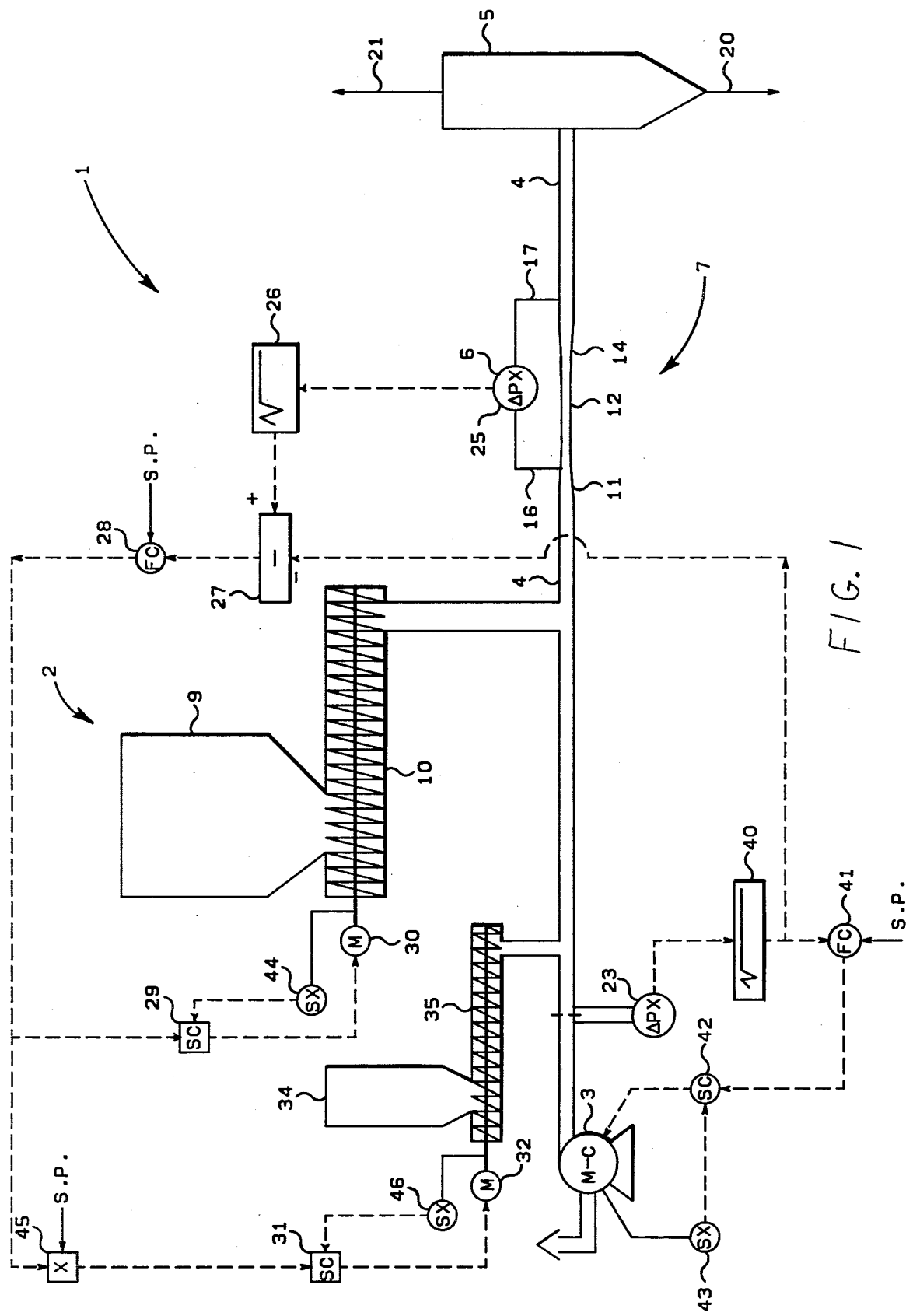
FIG. 1 is a diagrammatic illustration of a particulate materials conveying means.

The reference numeral 1 designates generally an apparatus for conveying particulate matter from a source 2 via a fluid carrier from a fluid source 3 along an elongate tubular member means 4 to a point of use apparatus or discharge 5. Differential pressure sensing means 6 are operably associated with a throat forming member 7 and is operable for measuring a pressure drop across at least a portion of the throat member 7.

The source 2 of particulate material can be any suitable type and as illustrated includes a storage bin or hopper 9 which has a feeder 10 such as a screw feeder or the like which is operable for feeding particulate material from the hopper 9 to the tubular member 4. The source 3 of fluid can be of any suitable type and as shown is a compressor which is operable for supplying a gas such as air to the tubular member at a position preferably upstream of the point at which the particulate material enters the tubular member 4. The compressor has a flow rate capacity and pressure capacity sufficient for conveying the particulate material along the length of the tubular member 4 to the apparatus 5.

At any suitable position along the tubular member 4 there is a differential pressure chamber or zone which preferably includes at least a portion of the throat member 7. However, it is to be noted that the differential pressure chamber can be a generally cylindrical chamber having substantially the same diameter as that of the tubular member 4. In a preferred embodiment the throat member 7 has a diameter less than that of the tubular member 4 and preferably the inside diameter of the throat member 7 is about 30 to about 70 percent of the inside diameter of the tubular member 4 and more preferably about 50 to about 65 percent. As shown in FIG. 1, the throat member 7 has an upstream converging section 11 with the downstream end of section 11 being connected to a throat section 12. Preferably, the total or included conical angle of convergence of section 11 is between about 20 and about 30 degrees. The throat section 12 has a length sufficient to effect a pressure drop of at least about 4 inches of water (1 kPa) along the length thereof at desired operating rates. In the illustrated structure and in a preferred embodiment, a diverging section 14 is connected to the downstream end of the throat section 12. The converging section 11, throat section 12 and diverging section 14 form a venturi. Preferably, the converging angle of the converging section 11 is such as to allow for relatively free flow of the particulate material therethrough. The diverging section 14 preferably has a total or included conical angle of divergence of between about 5 degrees and about 8 degrees.

The differential pressure-sensing means 6 can be of any suitable type and as shown includes conduits 16 and 17 which are connected to the tubular member 4 at opposite ends of the throat section 12 in spaced apart relation preferably a distance of at least about 3 throat diameters and preferably sufficient to measure a pressure differential of at least about 4 inches of water. The differential pressure-sensing means 6 can be of any suitable type such as a pneumatic or electrical differential pressure sensing means (e.g., the differential pressure-sensing means 6 can be of a Foxboro differential pressure transmitter manufactured by the Foxboro Co., Foxboro, Mass.), capable of accurate measurement of small differences in fluid pressure. The differential pressure-sensing means 6 can be of a manometer type which has a generally U-shaped tubular portion (not shown) which contains a liquid. When there is a differential between the pressure in conduits 16 and 17, there will be a change in the level of the liquid in the U-tube to indicate the pressure differential. Such manometers are well known in the art. The conduits 16 and 17 are spaced along the length of the throat member 7 with one preferably being at or adjacent the upstream end of the throat 12 or in the converging section 11 and the other being at or adjacent the downstream end of the throat 12 or in the diverging section 14. In the interest of minimizing the total pressure drop along the length of the tubular member 4, the throat 12 should be kept at a minimal length consistent with accurate flow rate measurements. Preferably, the conduits 16 and 17 are positioned to sense a pressure drop across a throat length which is at least about 3 times the inside diameter of the throat 12. More preferably, the length of throat across which a pressure drop is measured is at least about 10 times the inside diameter of the throat 12. If the conduits 16 and 17 are not positioned in the throat 12, then the pressure drop measurement will accordingly not be the pressure drop just along the throat 12 but will also include the pressure drop along the other portions of the tubular member between the conduits 16 and 17. However, the pressure drop measurement will still be representative of the pressure drop along the throat 12.

The use point apparatus 5 can be any suitable equipment or container. As shown, the use apparatus 5 can be a mixer, hopper or the like into which particulate material and carrier fluid can be fed and separated such as by cyclonic action. In one embodiment, more than one tubular member 4 can feed the apparatus 5. The additional tubular members from which additional particulate material can be fed to the apparatus 5 can be similar to the tubular member 4 with similar pressure-sensing means 6 and throat member 7, etc. The particulate material fed into the apparatus 5 is discharged via a discharge 20 while the carrier fluid is discharged via a discharge 21. The preferred fluid carrier is air, however, other fluid carriers can be used and can include liquids if the density of the particulate material will permit. For optimum operation of the invention, it is desirable to have a fluid carrier with a density much less than the density of the particulate material being conveyed, that is, the higher the density of the particulate material, the higher the density the fluid carrier can have.

In the illustrated structure there is a differential pressure transmitter 23, preferably operably connected in the conduit 4 downstream of the compressor 3. The differential pressure transmitter 23 is operable for measuring the pressure drop and accordingly the flow rate of the fluid carrier flowing through an orifice or the like in the conduit 4 and providing a signal representative of the square of the fluid carrier flow rate. This signal is transmitted to a device 40 for conversion of the pressure drop signal by taking the square root of the signal to provide a signal representative of the flow rate of the fluid carrier. The signal from the device 40 is transmitted to the measurement input of a flow controller 41 where the flow rate signal is compared to a set point signal representative of the desired flow rate to produce a control signal. The control signal from the flow controller 41 is transmitted to a speed controller 42 or the like which as shown is operably connected to the motor on the compressor 3. A speed transmitter 43 is operably connected between the motor of the compressor 3 and the speed controller 42 to provide a signal representative of the motor speed. The desired flow rate of the fluid carrier is controlled by manipulating the speed of the motor responsive to the control signal from the speed controller 41. Another means of controlling the fluid carrier flow rate is by the use of a flow control valve (not shown) connected in the conduit 4 which would then be operably connected to the flow controller 41 to regulate the rate of fluid flow through the conduit 4. Where two or more fluid streams are being combined and it is desirable to measure the flow rate of the individual fluid streams without particulate material, each fluid carrier stream can be controlled in a manner as described above.

The differential pressure-sensing means 6 includes a differential pressure transmitter 25 which is operable for providing a signal representative of the pressure drop through the throat 12. This pressure drop signal is then converted by a square root device 26 to a signal representative of the flow rate of the total of the fluid carrier and the particulate material. The device 26 can be any suitable means, for example, an AAI flow input module, P/NB03081 (available from Applied Automation, Inc., Bartlesville, Okla.). The output of the device 26 is transmitted to a subtractor means 27. The signal from the square root device 40 is also transmitted to the subtractor 27. The subtractor 27 acts on the signals from the devices 26 and 40 to provide a first signal representative of the difference between the combined flow rate of fluid carrier and particulate material flowing through the throat 12 and the flow rate of the fluid carrier flowing through the conduit 4. This difference signal is then representative of the flow rate of the particulate material per se. If desired, the subtractor means 27 can be provided with an integrated function to provide a smoothing action on the output signal. This difference signal can then be transmitted to the measurement input of a flow controller 28 in which the difference signal is compared with a set point to produce a control signal which is transmitted to a speed controller 29 which is operably connected to a drive motor on the feeder 10. The operating speed of the feeder 10 driven by the motor 30 is manipulated responsive to the control signal from flow controller 28 to maintain the input rate of particulate material from the feeder 10 at the desired value represented by the set point to controller 28. A speed transmitter 44 is operably connected to the motor 30 and the speed controller 29 to provide a signal representative of the motor speed.

The signal from the controller 28 can also be applied to an input of multiplying means 45 and be multiplied by a set point to produce a signal representative of the desired proportional relationship between the mass flow rate of the particulate material from feeder 10 and the mass flow rate of material from a feeder 35. The output signal from the multiplying means 45, representing the desired mass flow rate of material from the feeder 35, can be transmitted to a speed controller 31 which is operably connected to a motor 32 and is operable to provide a control signal. The motor 32 is operable for driving feeder 35 which feeds particulate material such as an antiblocking agent, antioxidant or the like from a hopper 34 or other similar storage device at a rate proportional to the flow of particulate material controlled by controller 28. The particulate material from the feeder 35 is fed to the tubular member 4 preferably on the downstream side of the compressor and on the downstream side of the pressure differential transmitter 23. In some instances it would be desirable to feed the particulate material from the feeder 35 into the tubular member 4 at a position upstream of the inlet from the feeder 10 and in other cases it would be desirable to introduce this particulate material at other positions in the tubular member, e.g., downstream of the inlet of the feeder 10. The control signal from the speed controller 31 manipulates the motor 32 responsive to the control signal from the speed controller 31 to maintain the desired value represented by the set point of the multiplier 45. A speed transmitter 46 is operably connected to the motor 32 and the speed controller 31 to provide a signal representative of the motor speed.

Figure 2:
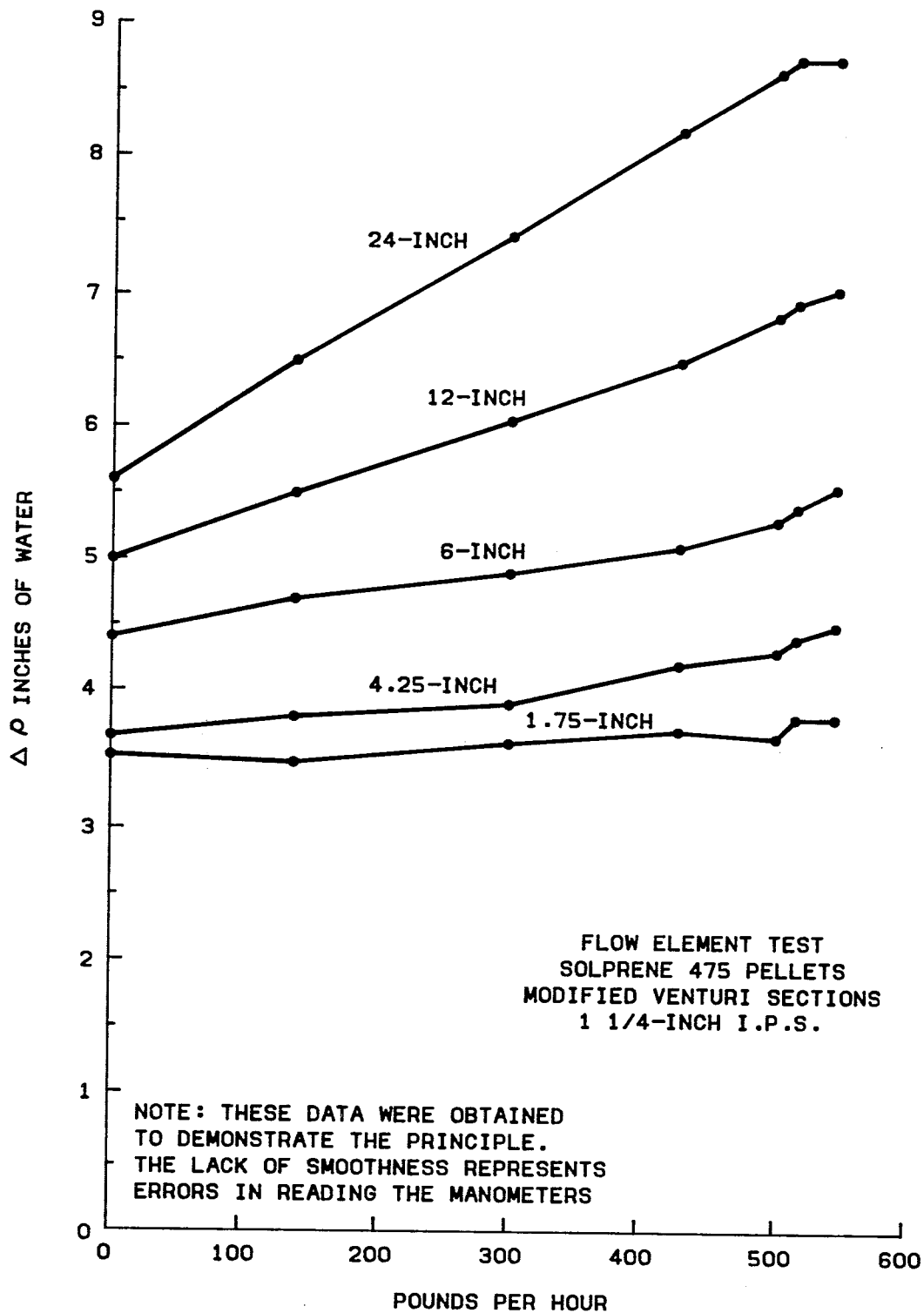
FIG. 2 is a graph illustrating a functional relationship of pressure drop to pounds per hour of particulate material being conveyed for various throat lengths of a given diameter throat for a venturi.
Figure 3:
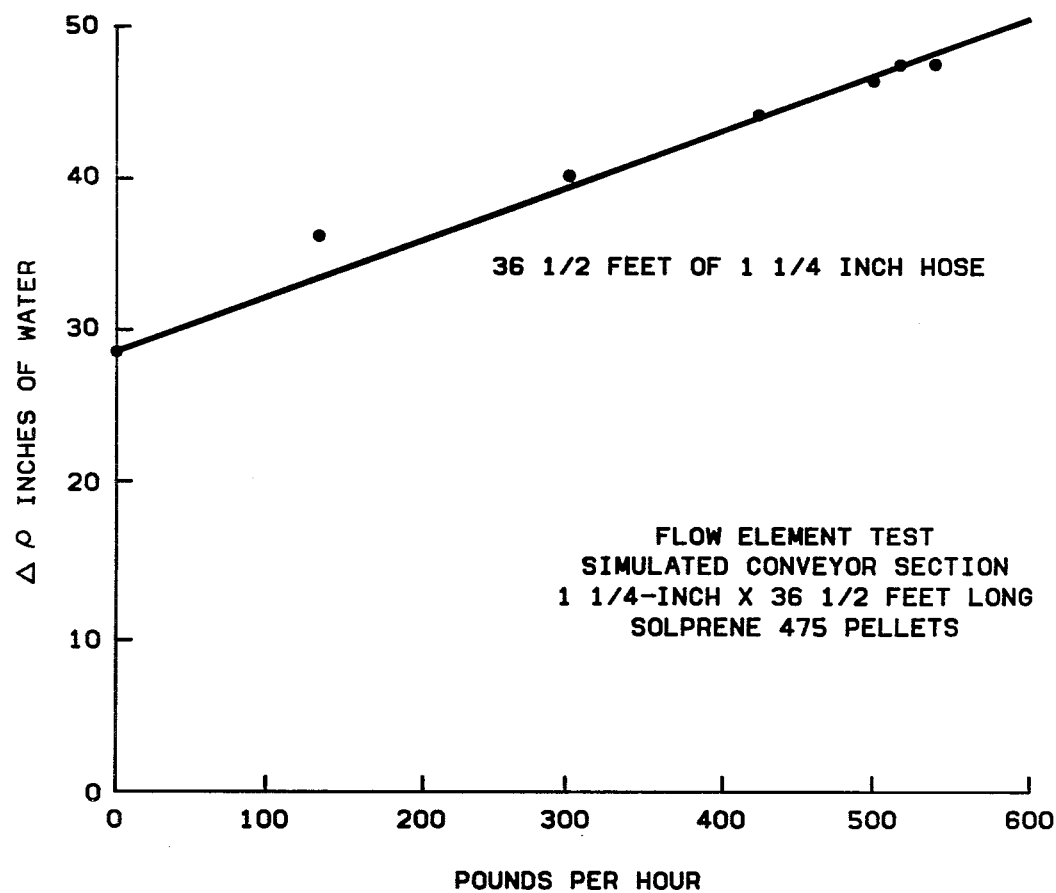
FIG. 3 is a graph illustrating a functional relationship of pressure drop to pounds per hour of conveyed particulate material for one throat length of a venturi.

In order to illustrate operability of the present invention, data are provided and are illustrated in FIGS. 2, 3 and 4. As seen in FIG. 2, there is shown the functional relationship of pressure drop in inches of water to pounds per hour of conveyed particulate material. Each line on the graph is for a different length throat section 12 each having the same inside diameter of 1¼ inches. As seen in FIG. 2, the longer the throat the greater the pressure drop along the length thereof for a given flow rate of particulate material. Also, the longer the length the steeper the slope of the line and consequently the greater the discrimination that can be achieved for determining the particulate material flow rate. Note that the 1¾ inches long throat is a relatively flat line while the 24 inch long throat is a relatively steep line. FIG. 3 illustrates a functional relationship between pressure drop in inches of water and particulate material flow rate in pounds per hour for a 36 and ½ foot long, 1¼ inches inside diameter throat 12. The line representative of this relationship is fairly linear, well within the margin of error and has sufficient slope to provide adequate discrimination for monitoring the flow rate of particulate material. FIG. 4 illustrates a functional relationship between pressure drop in inches of water and flow rate in pounds per hour. Three lines are provided on the graph, one of which illustrates a functional relationship for pressure drop due to the particulate material. Another line illustrates the relationship for pressure drop due to air flow through the throat. The third and bottom line shows the functional relationship for the flow rate of the particulate material minus the flow rate of the air as a function of pressure drop. The advantage of the difference line is that when there is no particulate material being conveyed there is a zero pressure drop difference.

The above graphs were plotted from data obtained using air as the carrier fluid and ⅛-inch polyethylene pellets having a bulk density of about 35 lb. per cubic foot and a specific gravity of about 0.94 as the particulate material. The pressure differential was measured using a Merian Model 1126 Bellows D/P Indicator.

In the operation of the apparatus as described above, there will be a need to calibrate the pressure-sensing means to correlate the measured pressure drop to the particulate material flow rate. The pressure sensing means should be recalibrated for different sizes of particles and/or different materials of different densities to obtain the most accurate results.

The measured pressure drop can be used to produce a signal representative of the pressure drop and transmitted to control means as are known in the art for regulating the fluid flow rate from the source 3 and the particulate material flow rate from the source 2 thereby controlling the flow rate of the particulate material to the use point 5.

The following examples are provided to illustrate the operability of the present invention which results have been charted on FIGS. 2, 3 and 4.

EXAMPLE I

A pneumatic transport system using a 2-inch (5.08 cm) Schedule 40 pipe to transport polymer pellets with air from a hopper equipped with discharge auger was used to test the invention. A venturi with a 24-inch (61 cm) long throat made from 1¼-inch (3.18 cm) Schedule 40 pipe with 10½° entrance cone and 3½° exit cone was tested at several pellet flow rates. The polymer was a solution rubber containing 75 wt. percent butadiene and 25 wt. percent styrene. The ⅛-inch (3.2 mm) pellets have a specific gravity of approximately 0.94. The following data are illustrative of the operation of the present invention:

| Polymer Flow Rate, lb/hr (kg/hr) | Air Flow Rate, ft³/hr (m³/hr) | Pressure Drop in H₂O (kPa) |
|---|---|---|
| 0 | 4034 (114) | 5.65 (1.41) |
| 60 (27) | 4006 (113) | 6.00 (1.49) |
| 140 (64) | 3966 (112) | 6.50 (1.62) |
| 280 (127) | 3910 (111) | 7.20 (1.79) |
| 380 (172) | 3846 (109) | 8.00 (1.99) |
| 440 (200) | 3814 (108) | 8.40 (2.09) |
| 475 (215) | 3782 (107) | 8.80 (2.19) |
| 480 (218) | 3778 (107) | 8.85 (2.20) |

It has been disclosed that the venturi meter used should have a length of at least four throat diameters, and preferably about 6 diameters or more to provide sufficient pressure drop. This is illustrated in the following example.

EXAMPLE II

Using the same system as in the previous example and transporting the same polymer pellets, pressure drop was measured across the throats of several venturi meters of various throat lengths, all constructed from 1½-inch (3.18 cm) Schedule 40 pipe:

| Polymer Flow Rate, lb/hr (kg/hr) | Pressure Drop, in. H₂O (kPa) Venturi Throat Length, in. (cm) | | | |
|---|---|---|---|---|
| | 1.75 (4.45) | 4.25 (10.8) | 6 (15.2) | 12 (30.5) |
| 0 | 3.5 (0.87) | 3.7 (0.92) | 4.4 (1.09) | 5.0 (1.24) |
| 135 (61) | 3.5 (0.87) | 3.8 (0.95) | 4.7 (1.17) | 5.5 (1.37) |
| 300 (136) | 3.6 (0.90) | 3.9 (0.97) | 4.9 (1.22) | 6.0 (1.49) |
| 425 (193) | 3.7 (0.92) | 4.2 (1.04) | 5.1 (1.27) | 6.5 (1.62) |
| 500 (226) | 3.7 (0.92) | 4.3 (1.07) | 5.3 (1.32) | 6.8 (1.69) |
| 540 (245) | 3.8 (0.95) | 4.5 (1.12) | 5.5 (1.37) | 7.0 (1.74) |

Air Flow rate was not recorded for these runs, but was approximately 4,000 cu. ft/hr (113 m³/hr) throughout.

It can be observed that the pressure drop increase over the range of polymer flow rates tested was quite small and somewhat erratic for the two shortest venturi meters. The 6-inch long throat was acceptable with a pressure drop range of 1.1 inches of water (0.27 kPa) over the range of tested polymer flow rates. The data points are only slightly erratic. The 12-inch meter was very satisfactory, the data points forming a smooth curve when they are plotted on arithmetic graph paper.

EXAMPLE III

Using the same system as in Example I, transporting the same polymer pellets with about 4,000 cu. ft/hr (113 m³/hr) of air, a 36½ ft (11.1 m) length of flexible 1¼ in (3.18 cm) hose was coupled to swages on a 2-inch (5.08 cm) Schedule 40 tubular member. The pressure drop across the hose was measured with a manometer as before for various pellet flow rates.

| Polymer Flow Rate, lb/hr (kg/hr) | Pressure Drop, in. H₂O (kPa) |
|---|---|
| 0 | 28.5 (7.09) |
| 135 (61) | 36 (8.96) |
| 300 (136) | 40 (9.95) |
| 425 (193) | 44 (10.9) |
| 500 (226) | 46.5 (11.6) |
| 540 (245) | 47.5 (11.8) |

These data points give a straight line on an arithmetic plot with only the point for 135 lb (61 kg) being somewhat removed from the line.

It is to be understood that while there has been illustrated and described certain forms of the present invention, the invention is not to be limited to the specific embodiments of the invention disclosed herein except to the extent that such limitations on their equivalents are found in the claims.

What is claimed and desired to be secured by Letters Patent is:

1. An apparatus for measuring flow rate of a particulate material in a fluid, said apparatus comprising:
    a tubular member through which flows said particulate material in a fluid, said tubular member having a generally cylindrical portion with a length of at least about 3 times the inside diameter of the generally cylindrical portion;
    differential pressure sensing means associated with said generally cylindrical portion and operable for producing a first signal representative of the pressure drop associated with the flow of fluid and particulate material through the generally cylindrical portion;
    flow rate measuring means associated with said tubular member operable for providing a second signal representative of a pressure drop associated with the flow of fluid through said tubular member;
    first control means associated with said tubular member upstream of said generally cylindrical portion operable for controlling the rate at which said particulate material enters said tubular member;
    a first square root device operable for receiving said first signal and providing a third signal representative of the flow rate of fluid and particulate material through the generally cylindrical portion;
    a second square root device operable for receiving said second signal and providing a fourth signal representative of the flow rate of fluid through said tubular member; and
    computer means associated with said first square root device and said second square root device and operable for receiving said third and fourth signals and generating a fifth signal proportional to the flow rate of said particulate material through said generally cylindrical portion, said computer means also operably associated with said first control means for controlling the rate at which said particulate material flows through said tubular member in response to said fifth signal.

2. An apparatus as set forth in claim 1, which further comprises:
    a source of fluid connected in flow communication to an upstream portion of said tubular member which is upstream of said cylindrical portion, and operable for inducing flow of fluid through said generally cylindrical portion; and
    a source of particulate material connected in flow communication to said tubular member upstream portion and being operable for supplying particulate material for conveying through said generally cylindrical portion with said fluid.

3. An apparatus as set forth in claim 2 including:
    receiving means connected in flow communication with said tubular member and being operable for receiving said particulate material and fluid and separating said particulate material from said fluid, said receiving means having a first outlet means for discharge of said fluid and having a second outlet means for discharge of said particulate material.

4. An apparatus as set forth in claim 1 wherein:
said tubular member includes a converging portion connected to an upstream end of the generally cylindrical portion and a diverging portion connected to a downstream end of the generally cylindrical portion, thereby forming a venturi.

5. An apparatus as set forth in claim 1 wherein:
said generaly cylindrical portion length is at least about 10 times the diameter of the generally cylindrical portion.

6. An apparatus as set forth in claim 1 wherein:
said generally cylindrical portion length is sufficient to effect a pressure drop along said length of at least about 4 inches of water.

7. An apparatus as set forth in claim 1 wherein:
said generally cylindrical portion length is at least about 10 times the diameter of the generally cylindrical portion.

8. An apparatus as set forth in claim 1 wherein:
said generally cylindrical portion length is sufficient to effect a pressure drop along said length of at least about 4 inches of water.

9. An apparatus as set forth in claim 1 wherein said differential pressure sensing means includes:
a pair of pressure sensing conduits each communicating with said generally cylindrical portion in spaced apart relationship of a distance of at least about said generally cylindrical portion length along said generally cylindrical portion.

10. An apparatus as set forth in claim 9 wherein:
said pressure sensing conduits are of a pneumatic type.

11. An apparatus for measuring flow rate of a first and a second particulate material in a fluid, said apparatus comprising:
a tubular member through which flow said particulate materials in a fluid, said tubular member having a generally cylindrical portion with a length of at least about 3 times the inside diameter of the generally cylindrical portion;
differential pressure sensing means associated with said generally cylindrical portion and operable for producing a first signal representative of flow rate of said fluid and particulate materials through the generally cylindrical portion;
flow rate measuring means associated with said tubular member and operable for providing a second signal representative of the flow rate of the fluid flowing in said tubular member;
first control means associated with said tubular member and operable for controlling the rate at which said first particulate material flows through said tubular member;
computer means operably associated with said pressure sensing means and said flow rate measuring means and operable for receiving said first and second signals and generating a third signal representative of the flow rate of the particulate material per se, said computer means also operably associated with said first control means wherein said third signal is transmitted to said first control means for controlling the rate at which said first particulate material flows through said tubular member; and
second control means operably associated with said tubular member operable for controlling the rate at which said second particulate material flows through said tubular member, said second control means being operably associated with said computer means wherein a fourth signal proportional to said third signal is transmitted to said second control means to regulate the rate at which said second particulate material flows through said tubular member.

12. An apparatus as set forth in claim 11 which further comprises:
a source of fluid connected in flow communication to an upstream portion of said tubular member and upstream of said cylindrical portion and being operable for inducing flow of fluid through said generally cylindrical portion;
a first source of particulate material connected in flow communication to said tubular member upstream portion and being operable for supplying particulate material for conveying through said generally cylindrical portion with said fluid; and
a second source of material connected in flow communication with said tubular member and being operable for supplying material into said tubular member.

13. An apparatus as set forth in claim 12 wherein:
said first and second control means control the rates at which said materials flow through said tubular member by manipulating the rates at which said materials are supplied to said tubular member from said first and said second sources.

14. An apparatus as set forth in claim 11 wherein:
said tubular member includes a converging portion connected to an upstream end of the generally cylindrical portion and a diverging portion connected to a downstream end of the generally cylindrical portion, thereby forming a venturi.

15. An apparatus as set forth in claim 11 wherein:
said generally cylindrical portion length is sufficient to effect a pressure drop along said length of at least about 4 inches of water.

16. An apparatus as set forth in claim 11 which further comprises:
receiving means connected in flow communication with said tubular member and being operable for receiving a mixture of said particulate material and fluid and separating said particulate material from said fluid, said receiving means having a first outlet means for discharge of said fluid and having a second outlet means for discharge of said particulate material.

17. A method of measuring flow rate of particulate material being carried in a tubular member by a fluid carrier, said method including:
flowing a fluid through a tubular member;
measuring a first pressure drop experienced by said fluid as it flows through a portion of said tubular member;
introducing a particulate material into said tubular member to form a mixture of fluid and particulate material;
flowing said mixture of fluid and particulate material through a generally cylindrical portion of said tubular member, said generally cylindrical portion having a length of at least about 3 times its inside diameter;
measuring a second pressure drop experienced by said mixture as it flows through said generally cylindrical portion;

generating a first signal representative of the square root of said first pressure drop and a second signal representative of the square root of said second pressure drop;

subtracting said first signal from said second signal to produce a third signal proportional to the flow rate of particulate material; and controlling the flow rate of particulate material carried in the tubular member in response to said third signal.

18. A method as set forth in claim 17 wherein:

said mixture first flows through a converging portion of said tubular member immediately before flowing through said cylindrical portion and said mixture flows through a diverging portion of the tubular member immediately after flowing through the generally cylindrical portion.

19. A method as set forth in claim 18 wherein:

said generally cylindrical portion length is at least about 10 times the diameter of the generally cylindrical portion.

20. A method as set forth in claim 18 wherein:

said generally cylindrical portion length is sufficiently long to achieve a pressure drop of at least about 4 inches of water along said length.

21. A method as set forth in claim 17 wherein:

said generally cylindrical portion length is at least about 10 times the diameter of the generally cylindrical portion.

22. A method as set forth in claim 17 wherein:

said generally cylindrical portion length is sufficiently long to achieve a pressure drop of at least about 4 inches of water along said length.

23. A method as set forth in claim 19 wherein:

said pressure drop is measured by pneumatic pressure sensing means.

24. A method as set forth in claim 17 wherein:

said pressure drop is measured with a manometer means.

25. A method of measuring flow rate of particulate materials being carried in a tubular member by a fluid carrier, said method including:

flowing a mixture of fluid and particulate material through a tubular member having a generally cylindrical portion through which said mixture flows, said generally cylindrical portion having a length of about at least about 3 times the inside diameter of the generally cylindrical portion;

measuring a pressure drop along said length;

correlating said pressure drop to the flow rate of the mixture of fluid and particulate materials;

generating a first signal representative of the flow rate of the mixture of fluid and particulate material and a second signal representative of the flow rate of the fluid;

subtracting said second signal from said first signal to produce a third signal representative of the flow rate of particulate materials;

controlling the flow rate of particulate materials carried in the tubular member in response to said third signal;

introducing a second material into said tubular member; and regulating the introduction of said second material in response to said third signal.

26. A method as set forth in claim 25 wherein:

said mixture first flows through a converging of said tubular member immediately before flowing through said generally cylindrical portion and said mixture flows through a diverging portion of the tubular member immediately after flowing through the generally cylindrical portion.

27. A method as set forth in claim 26 wherein:

said generally cylindrical portion length is at least about 10 times the diameter of the generally cylindrical portion.

28. A method as set forth in claim 26 wherein:

said generally cylindrical portion length is sufficiently long to achieve a pressure drop of at least about 4 inches of water along said length.

29. A method as set forth in claim 25 wherein:

said generally cylindrical portion length is at least about 10 times the diameter of the generally cylindrical portion.

30. A method as set forth in claim 25 wherein:

said generally cylindrical portion length is sufficiently long to achieve a pressure drop of at least about 4 inches of water along said length.

31. A method as set forth in claim 25 wherein:

said pressure drop is measured by pneumatic pressure sensing means.

32. A method as set forth in claim 25 wherein:

said pressure drop is measured with a manometer means.

* * * * *

UNITED STATES PATENT AND TRADEMARK OFFICE
CERTIFICATE OF CORRECTION

PATENT NO. : 4,198,860
DATED : April 22, 1980
INVENTOR(S) : William R. King

It is certified that error appears in the above—identified patent and that said Letters Patent are hereby corrected as shown below:

Column 11, line 36, "19" should read --- 17 ---;
Column 12, line 21, after "converging" insert --- portion ---.

Signed and Sealed this

Thirtieth Day of September 1980

[SEAL]

Attest:

SIDNEY A. DIAMOND

Attesting Officer

Commissioner of Patents and Trademarks